(12) United States Patent
Goodwin et al.

(10) Patent No.: US 9,208,449 B2
(45) Date of Patent: *Dec. 8, 2015

(54) PROCESS MODEL GENERATED USING BIASED PROCESS MINING

(71) Applicant: International Business Machines Corporation, Armonk, NY (US)

(72) Inventors: Richard T. Goodwin, Dobbs Ferry, NY (US); Pietro Mazzoleni, New York City, NY (US); Aubrey J. Rembert, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 440 days.

This patent is subject to a terminal disclaimer.

(21) Appl. No.: 13/833,216

(22) Filed: Mar. 15, 2013

(65) Prior Publication Data

US 2014/0279735 A1 Sep. 18, 2014

(51) Int. Cl.
*G06F 15/18* (2006.01)
*G06N 99/00* (2010.01)
*G06N 5/02* (2006.01)
*G06Q 40/00* (2012.01)

(52) U.S. Cl.
CPC .............. *G06N 99/005* (2013.01); *G06N 5/022* (2013.01); *G06Q 40/00* (2013.01)

(58) Field of Classification Search
None
See application file for complete search history.

(56) References Cited

U.S. PATENT DOCUMENTS

| 5,993,348 | A | 11/1999 | Arbrink |
| 7,072,876 | B1 | 7/2006 | Michael |
| 7,167,846 | B2 | 1/2007 | Provost et al. |
| 7,454,430 | B1 * | 11/2008 | Komissarchik et al. ... 707/999.1 |
| 8,005,781 | B2 | 8/2011 | Devarakonda et al. |
| 8,019,701 | B2 | 9/2011 | Sayyar-Rodsari et al. |
| 8,060,511 | B2 | 11/2011 | Hadley et al. |
| 2003/0130991 | A1 | 7/2003 | Reijerse et al. |
| 2003/0217052 | A1 * | 11/2003 | Rubenczyk et al. .............. 707/3 |
| 2005/0169533 | A1 * | 8/2005 | Paragyios ..................... 382/203 |
| 2007/0220034 | A1 | 9/2007 | Iyer et al. |
| 2011/0087700 | A1 | 4/2011 | Lo et al. |
| 2011/0191277 | A1 * | 8/2011 | Ag ndez Dominguez et al. .............................. 706/12 |
| 2012/0179586 | A1 | 7/2012 | Mohanty et al. |

OTHER PUBLICATIONS

Brohman, M. Kathryn, "Knowledge Creation Opportunities in the Data Mining Process", Proceedings of teh 39th Hawaii International Conference on System Sciences, IEEE 2006, pp. 1-10.

Li, Guoqi, et al., "A Novel Ontology-Aided Method for Integrating Prior Knowledge into Data Mining", 2009 World Congress on Computer Science and Information Engineering, IEEE Computer Society, pp. 311-314.

* cited by examiner

*Primary Examiner* — Kakali Chaki
*Assistant Examiner* — Luis Sitiriche
(74) *Attorney, Agent, or Firm* — Cantor Colburn LLP; Louis Percello

(57) ABSTRACT

Embodiments relate to a method, system, and computer program product for a process model. The method includes extracting data associated with a process execution trace of a running process and extracting any prior knowledge data relating to the running process. The method also includes calculating at least one transition confidence parameter for the prior knowledge data; and identifying any existing process models relating to the running process. A confidence trace bias is also generated for any existing process model identified. An enhanced bias value is then calculated by combining the confidence trace bias value and value of the transition confidence parameter. Using as input the extracted process execution trace data, the prior knowledge data, the identified existing model and the enhanced bias value, a learned process model is then generated.

17 Claims, 5 Drawing Sheets

PROCESS MODEL GENERATED USING BIASED PROCESS MINING

BACKGROUND

The present disclosure relates generally to process mining and more specifically to process models that are generated using biased process mining.

Process mining is a relatively young discipline which combines computational intelligence, data mining, process modeling and analysis at the same time. Process mining allows for the analysis of business processes based on recorded information. The basic idea is to extract knowledge from what is recorded by an information system. The information that is recorded is referred to as events. Each event may refer to an activity. Events can include a variety of activities such as withdrawing cash from an automated machine, applying on line for a home equity loan, or even receiving an electronic ticket for a concert on-line.

Each of these recorded events provides data related to the event and so it is appropriately referenced as event data. Process mining's objective is to exploit the recorded event data in a meaningful way so that it provides insight in developing a business process and identify potential problems and bottlenecks. Recorded events can also be referred to as event logs. In conventional process mining using event logs, it is assumed that there is a possible way to sequentially record events.

Process mining aims at improving processes by providing techniques and tools for discovering process, control data, organizational and social structures. Processes can also be improved by asking process owners to recall the steps involved in performing a certain activity and then recording it in a manner similar to event logs. This latter can be performed by interviewing process owners either directly or using information technology. In either case, the idea of process mining is to discover, monitor and improve over time what is required to establish a process associated with a certain activity. Process mining data pertaining to already completed process mining can be used to help form a control flow and a time perspective that can then be applied to current running processes.

BRIEF SUMMARY

Embodiments include a method and computer program product for a process model. The method includes extracting data associated with a process execution trace of a running process and extracting any prior knowledge data relating to the running process. The method also includes calculating at least one transition confidence parameter for the prior knowledge data; and identifying any existing process models relating to the running process. A confidence trace bias is also generated for any existing process model identified. An enhanced bias value is then calculated by combining the confidence trace bias value and value of the transition confidence parameter. Using as input the extracted process execution trace data, the prior knowledge data, the identified existing model and the enhanced bias value, a learned process model is then generated.

In an alternate embodiment a related system is provided. The system includes a processor for extracting process execution trace data and prior knowledge data relating to a running process from a memory. The processor calculates a transition confidence parameter for the prior knowledge data. The system also includes a data manager in communication with the processor for identifying any existing process models relating to the running process. The processor generates a confidence trace bias for any existing process model identified and calculating an enhanced bias value by combining the value of the trace bias and that of the transition confidence parameter. A process then generates a learned process model by using as input the execution trace data, the prior knowledge data, the identified existing model and the enhanced bias value.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Figure 1:
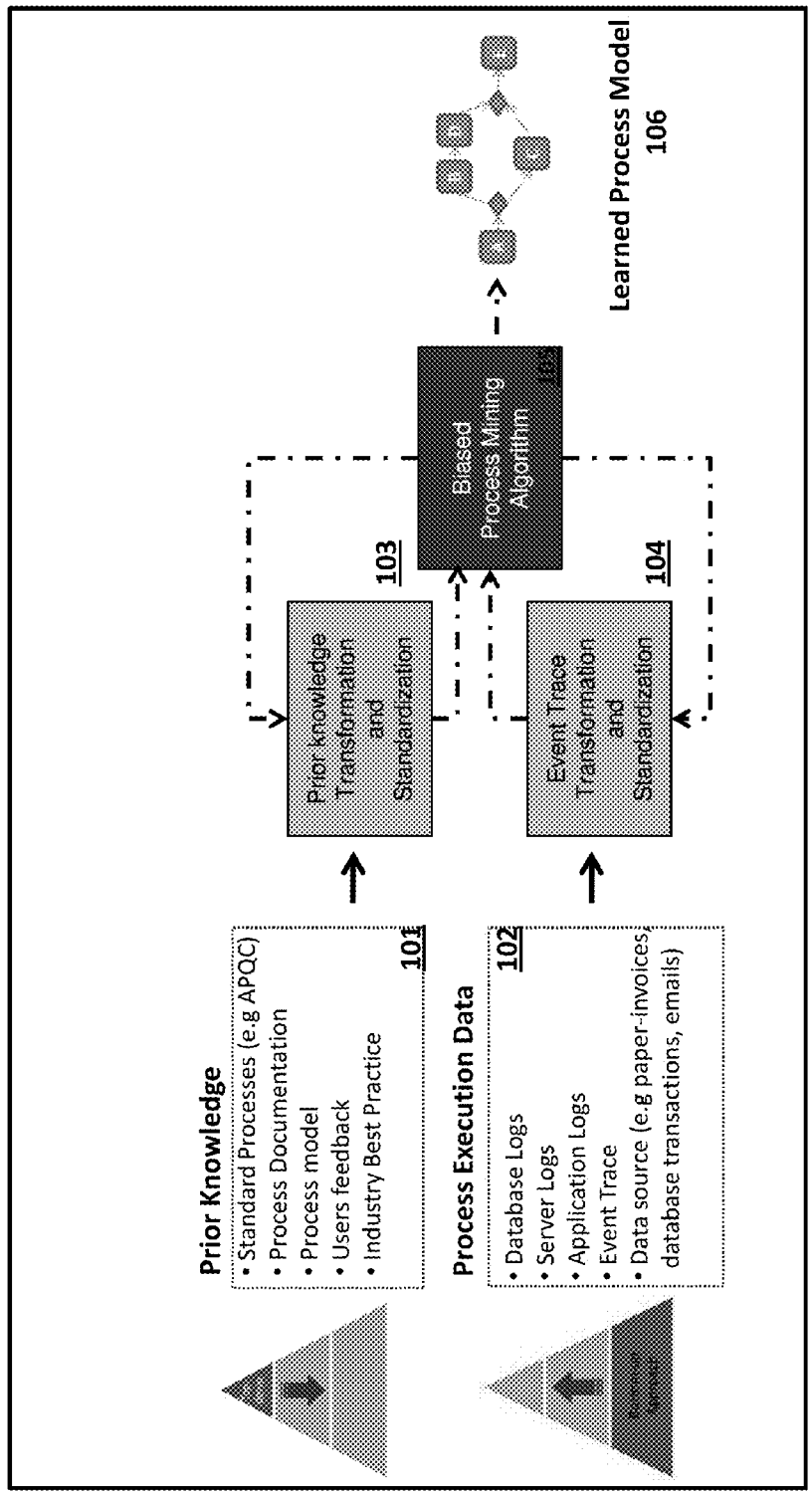
FIG. 1 depicts a block diagram illustrating a process model in accordance with an embodiment.

FIG. 1 provides a block diagram illustrating one embodiment of the present invention. In FIG. 1, a process model is shown that is formed from both prior knowledge 101 and process execution data 102. The starting point for process mining is the development of a model. If no prior model exists, the process starts in two possible ways. One way is called the top-down approach where business process actors are interviewed by business consultants based on a particular need and a model is developed. Another way of developing a model is called a bottoms-up approach where empirical data are obtained, such as through information technology system logs, to indicate what was done. In either case, both approaches look to the completion or potential desire to complete one or more activities in order to develop such a model. These activities are the same as events. The steps to start/complete such events are then recorded either by the consultants or in event logs. For example, if a model needs to be developed for a person's personal banking management, the events may include depositing a check, withdrawing money from an account by using an automated teller machine (ATM) or looking at bank statements on a weekly basis.

Action completion requirements are then recorded such as in event logs and then subsequently compiled to provide a cohesive overall picture of the process. A model is then compiled based on this overall picture. The new generated model helps streamline a particular series of activities and improve efficiency while doing so. Having a model can also help reduce process time or process cost and anticipate future problems.

Once a mode is developed, event logs continue to be recorded and reviewed. This monitoring of the event logs will ensure compliance with the model that was developed. This monitoring will also help minimize deviations from the model, pinpoint problem areas and prevent bottlenecks.

Besides development of a model and process monitoring to ensure compliance, review of event logs can also achieve future enhancement of the current existing model. Enhancement can be achieved by monitoring and looking at event logs to see if the process can be improved in any way. This can lead to reducing process steps, redoing activities in a certain way to avoid areas currently causing bottle necks and improving cost. In certain cases, the way certain activities are completed may also change over time which would be recorded by event logs and therefore enhancements can be made based on such changes to maintain the overall adherence to the best model that can be structured. This will help improve real processes on a continuous basis.

The challenge with coming up with a working process model based on already occurred events is to accurately recall details relating to past processes. If a top down approach is performed, the details of these past processes are often provided by business owners. Unfortunately, different individuals may recall past events differently. The same may be true for processes that have to occur in the future. Business owners and managers may not always agree on how these processes need to be performed. Furthermore, many organization may not actually have coherent enumeration of their of all their actual operations which can further add to the problem. For example, the operations may not be enumerated in sufficient details or changes might not have been kept up with changes on running system to reflect software or process upgrades. Other problems may include scattered and fragmented information in multiple documents, non-standard form that is difficult to consume and other merger of data that is not accumulated in one place. Therefore, given the problems and challenges of the process mining, concentrating on models that are either top down or bottoms down in approach alone will provide only part of a process, leaving information from the model out. Referring back to FIG. 1, a comprehensive model is provided that takes advantage of a variety of business model approaches, such as the top down and the bottoms down approach discussed, simultaneously. As can be appreciated other business models that are limited to bottoms up or top down approaches can also be combined using this embodiment as can be appreciated by those skilled in the art.

In the example provided by embodiment illustrated in FIG. 1, a learned process model 106 will be provided that combines prior knowledge 101 with the process execution data 102. In this embodiment, prior knowledge 101 can include a number of factors including but not limited to previous existing models, standard process knowledge such as APQCs, process documentation, information from business owners, industry best practices and user feedbacks. In most instances, this prior knowledge reflects a top-down process. However, this is not always the case. Similarly, process execution data 102 can include database logs, server logs, application logs, event trace and any other types of physical or electronic data such as data source that can include such items as paper invoices, database transactions and emails.

The process knowledge 101 and process execution data 102 are considered as input to create other intermediary output before a new learned process model 106 can be generated. The data gathered as prior knowledge or process execution data is further handled and processed by standardizing and transforming it so that it can be used by a mining process. In the embodiment of FIG. 1, this further processing including standardization and transformation of data is illustrated by blocks 103 and 104. In this embodiment, the prior knowledge and process execution are separately processed in blocks 103 and 104 but in other embodiments, they can be processed simultaneously or in combination.

The process mining 105 then combines the input and provides it further transformed and standardized. As will be shown in FIG. 2, the process mining 105 also takes into account old and existing processes as well as event logs and process execution data that was previously generated and stored. In this embodiment, the process mining 105 also generates the model 106 by further assigning a bias based on success of outcomes given different approaches. The process mining 105, hereinafter referenced as biased process mining 105, in one embodiment calculates the best approach based on this biased as well as other input such as that provided by existing models. This approach is especially successful in cases where certain paths and outcomes are unknown. In such a case, those paths can be found and the process can be ameliorated using this approach. In one embodiment, as shown in FIG. 1, the biased process mining technique 105 can be further enhanced by utilizing an algorithm that can be processed by a computer or a processor. Once the biased process mining techniques 105 are fully completed, the learned process model 106 can finally be generated.

Figure 2:
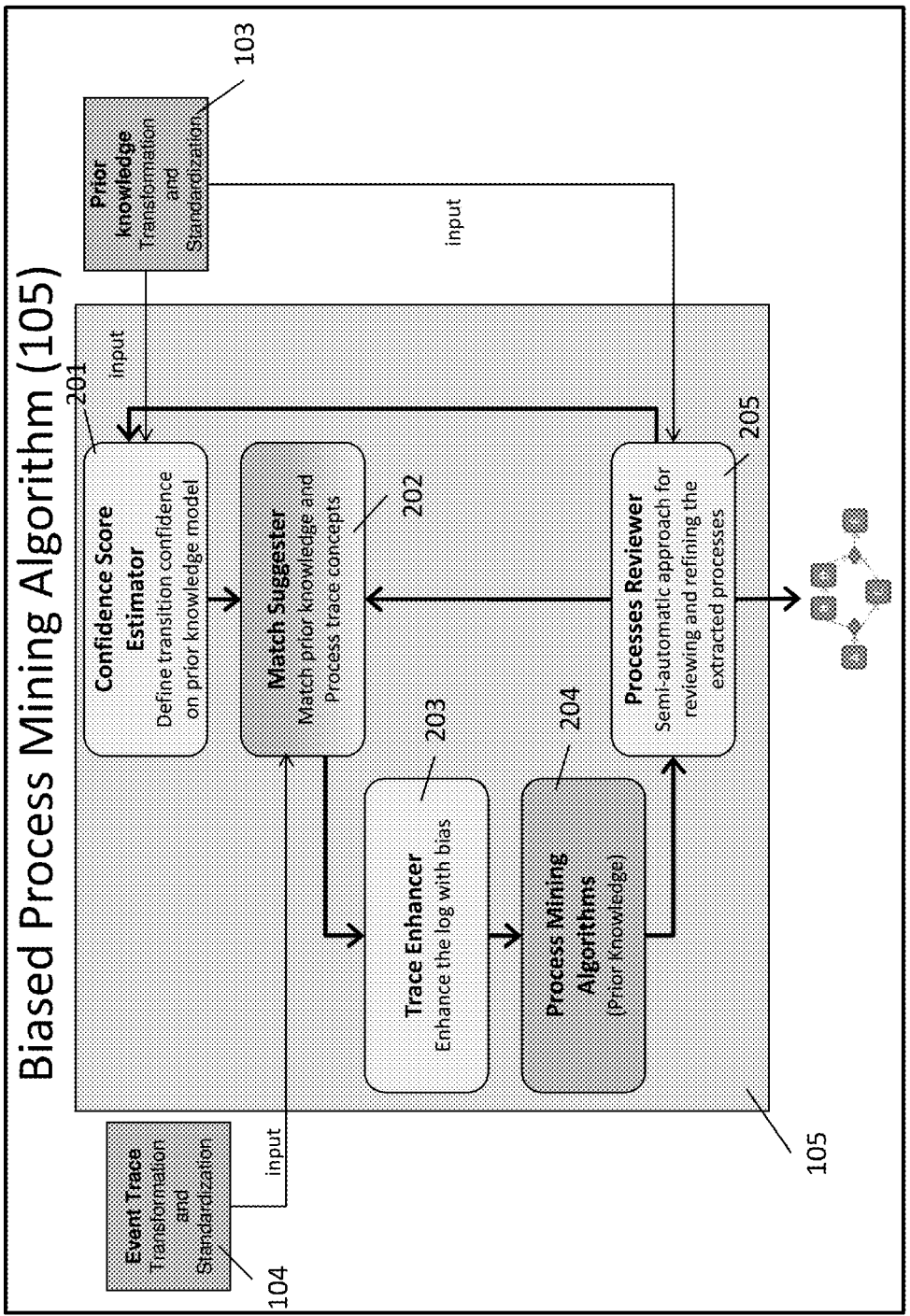
FIG. 2 depicts a block diagram illustrating a biased process mining technique in accordance with an embodiment.

FIG. 2 provides a more detailed embodiment of the biased mining process component 105. In the block diagram illustration of FIG. 2, prior knowledge and event trace data after standardization and transformation, illustrated by numerals 103 and 104 as before in FIG. 1, are provided as input to the biased mining process component 105. In FIG. 2, as will be further discussed the input data provided by prior knowledge and events is further enhanced by using semantic matching components and calculating confidence and bias scores.

Semantic matching of components received from the prior knowledge and process execution components can be performed, sometimes semi-automatically such that exact matches can be identified. The semantic matching can include similarities identified by searching synonyms, holonyms, hypernyms or others as can be appreciated by those skilled in the art. The matching can be helpful in identifying similar prior processes and for similarities that may currently exist between other process model activities and process execution data events.

The embodiment of FIG. 2 also takes advantage of prior knowledge relating to process success confidences. Confidence scores can be used to calculate bias scores subsequently. Confidence scores can be assigned early in the process to scale degree of influence over the process mining and development of future modes. In the embodiment of FIG. 2, this can artificially boost the process execution logs with data that supports more confident parts of the prior knowledge.

A confidence score or parameter can be defined in degree of success of task completion or model. For example, a prior model might have been developed based on expectations of process owners or based on previous data. A confidence score or parameter can then be thought of as a likelihood of accuracy and success that a certain process model will actually complete a task as expected. A parameter with a lower confidence score then can be monitored more closely, in one embodiment or other components may be put in place to actually counterbalance the lack of a higher score. A confidence parameter is different than a bias score in some circumstances but may close in others as will be presently discussed.

In statistics, if an experiment is conducted in randomness, over time it will yield results that are close to expected statistical results. For example, the likelihood of a tail turning up in a coin toss is around 50 percent. However, if the experiment is repeated many times, one may get slightly different data each time. A statistical estimator may even provide a slightly different estimate each time based on error or deviation estimates. Normally, in statistical terms the true value of the parameter is a constant, and the experimental estimate is a probabilistic variable. The bias in statistical terms is systematic, or average, difference between these two values with the variance as the leftover probabilistic component. What is referred to as a bias, is not defined in statistical terms in this way. Rather bias is a condition, unknown at time of estimate that can affect the outcome of the data. For example, in the case of the coin toss above if the coin is slightly heavier on one side than the other the possibility of the outcome being a tail may suddenly be reduced from a 50 percent chance to a 25 percent chance. This will affect the way the probability calculations are being performed and will result in a need to shift the structure of a model.

Referring back to FIG. 2, once input data is provided by in form of enhanced prior knowledge and process execution data as illustrated by 103 and 104, the biased process mining process 105 starts. A Confidence Score Estimator 201 then provides transition confidence scores and data obtained through any related prior knowledge models. To understand the process of confidence score estimation, an example may be helpful. In one embodiment the input to the Confidence Score Estimator 201 can be thought of in the following manner. A prior process model P=(A, F, K) where A is a set of activities and routing constructs (AND, OR) and F is a set of directed edges that are a subset of (A XA0. F represents flow relationships between A. And K: F→(0, 1) U {Null} is an optional confidence score assigned to elements in F.

Another input provided is the process execution log which can be defined as L. In this case if E is a set of all activities in Business Process B, and E' is the set of all strings that can be generated from E, then each of the strings in E" is called a trace. Therefore L is a subset of traces t, in E" that can be generated by B.

The Output the Learned Process Model P' then can be thought of as P"=(E, M) where E" is a set of unique event names found in L and E" is a subset of E. M is the set of minded flow relationships such that a flow relationship between, e1 (event 1) and e2 (event 2) in E' occurs if e2 follows e1 in the process execution log a statistically significant number of times.

To computer the matching number score then between A and E, for each flow relationship f in F, if the activities (a1, a2) in f are matched to events e1 and e2 in E, boost the occurrence of follows relationship between e1 and e2 in L by a factor of the confidence score K(f). The latter is called the boosting of L. If K(f)=Null, then a default confidence score is used. In this way the process mining process can be used to infer the dependence relationships between events in the boosted version of L. An example of this is provided in FIG. 3.

The confidence Score Estimator 201 in this way defines the transition confidence on any prior knowledge models and provides this also to the Match Suggester 201 as to eventually boost the process execution data artificially if needed. Prior models can be located as discussed such as through a semantic matching of components (in the prior knowledge components including old process models). This may be performed by using a Match Suggester component such as the one shown in FIG. 2 at 202. The Match Suggester 202 identifies semantic matches between process model activities to process execution data events using exact matches, synonyms, holonyms and hypernyms and other tools as discussed. As illustrated by the figure, the confidence score provided by the Estimator 201 is also provided to the Match Suggester 202.

Figure 4:
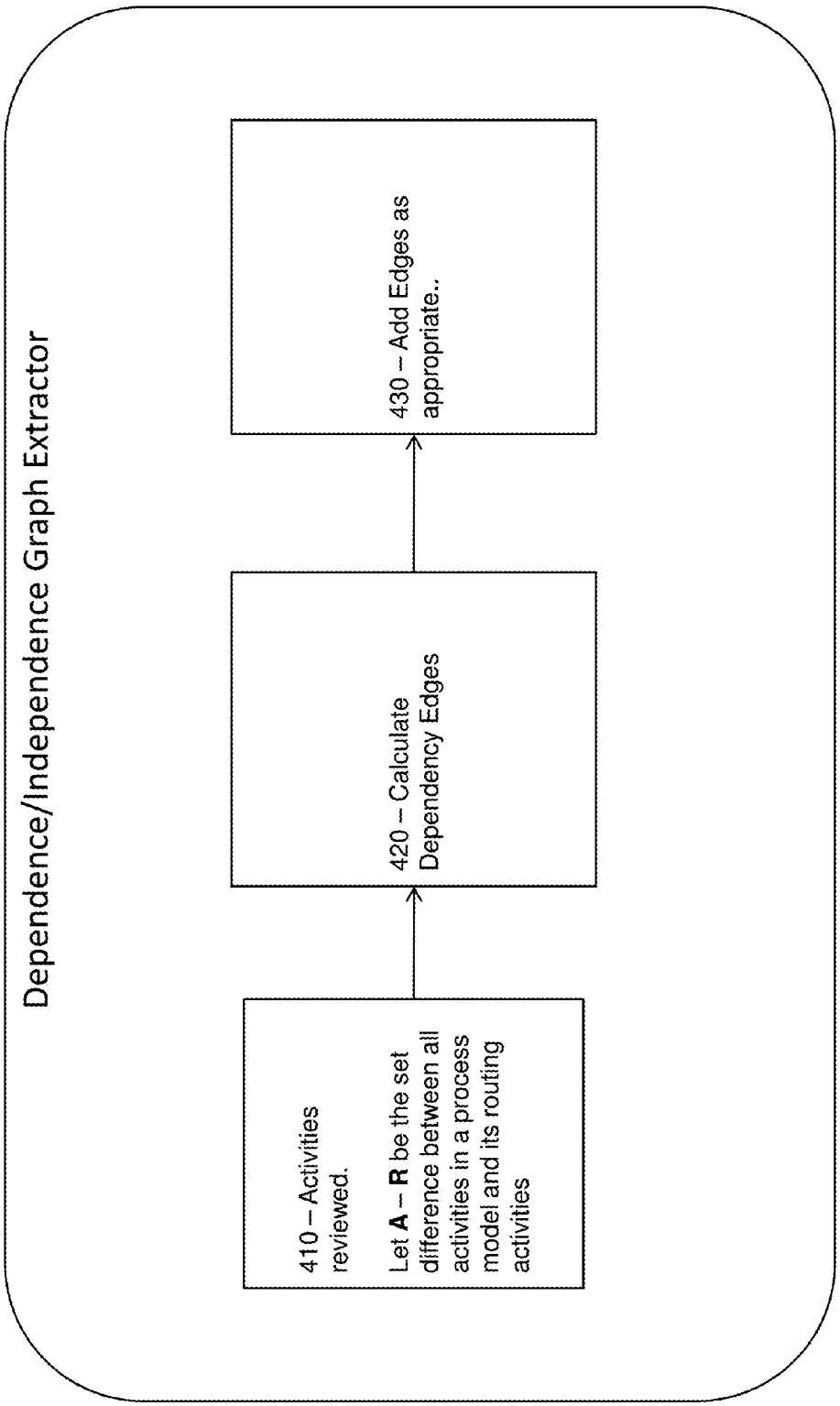
FIG. 4 depicts a block diagram illustrating a Graph Extractor in accordance with an embodiment.

Looking back at FIG. 2, the prior knowledge data are mixed with process execution data to provide the input to the biased process mining. As can be viewed, the prior knowledge was matched against the events related to a business process to provide the Confidence Scores as discussed. The event trace 104 and knowledge transformation 103 are provided directly to the confidence score estimator 201 which defines the transition confidence on prior knowledge model. The score will then be provided to the Match Suggester 202 which will be further discussed in FIG. 5. This will yield Trace Enhancer 203 which enhances the log with a bias and ultimately provide a process mining algorithm 204 as discussed. A process Reviewer 205 can then be used to provide a semi automatic approach for reviewing and refining the extracted processes. The prior knowledge is then also provided directly to the Process reviewer to ensure compliance with the process once a model is formed. A Graph Extractor can also be used as shown in FIG. 4.

A Process Reviewer 205 monitors the process of Confidence Score estimation and semantic matching at all times. The Process Reviewer 205, in one embodiment, can be provided using a semi-automatic approach. In this way, the Process Reviewer 205 continually refines the extracted processes. The Process Reviewer 205 provides input into the Match Suggester 202 and Confidence Score Estimator 201 components iteratively. Therefore as needed, confidence scores can be altered or assigned/reassigned to portions of the prior knowledge. For example, in one embodiment a trace enhancer 203 can be used in this manner to further enhance log data with a bias as needed. In one embodiment, one or more algorithm used for process mining can then be used once the data is boosted and the sections that are provided with confidence (confident parts of prior knowledge) is appropriately adjusted. This is shown at 204. The use of an algorithm can be replaced by other means as can be appreciated by those skilled in the art.

Once the matching process has been performed and completed and the appropriate confidence score is assigned to the matched portions, a bias can be created to boost the process execution log to achieve an optimal working model. In other words, the confidence score is assigned to portions of the prior knowledge to scale the degree of influence over the new process mining model. To complete the process, an artificial boost can be provided as discussed to the process execution log with additional data that supports more confident parts of the prior knowledge to achieve a working model.

Figure 3:
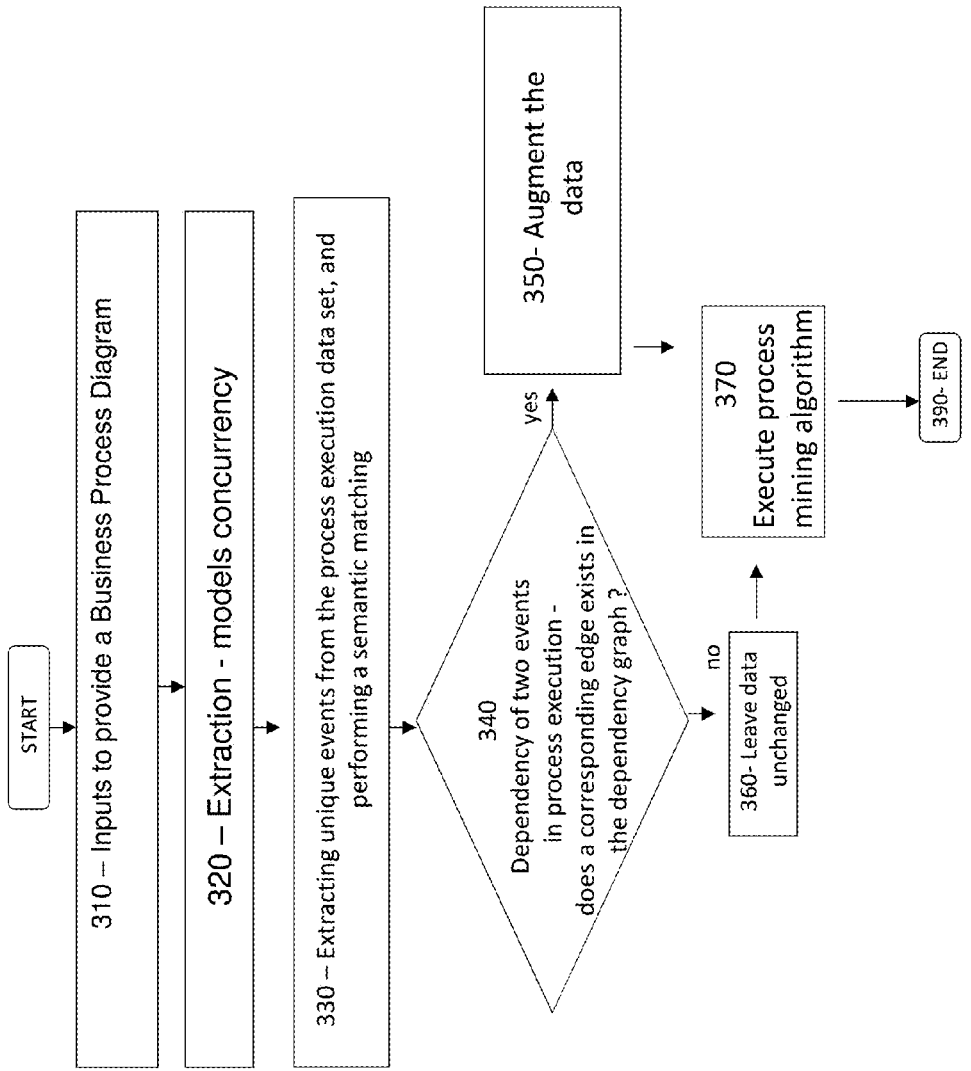
FIG. 3 depicts a process flow for an exemplary process model in accordance with an embodiment.

FIG. 3 is a flowchart illustration of a Business Process Diagram that can be augmented with confidence scores and bias as discussed in FIG. 2. As shown, the process starts at block 310 with providing inputs required for the process. In block 320, a dependency graph is extracted as will be discussed in more detail in FIG. 4. The extractor is used to models all causal dependencies and an Independence graph can also be used to model concurrency. In block 330, the unique events from the process execution data set is extracted. Consequently, a semantic matching is performed from labels on the vertices of the dependency graph to the unique event names from the process execution data set. In block 340, a decision block is provided. The two events are under consideration for determining dependency based on their occurrence in process execution data. If a match is found indicating a corresponding edge exists in the dependency graph then the data is augmented as provided in block 350. This augmentation is considered with dependency pattern by factor of the confidence score. Otherwise if there is not matching determination in block 340, then the data is left unchanged 360. In either case (350 or 36) the process mining algorithm is then executed to its completion and the process is terminated subsequently.

FIG. 4 provides a block diagram illustration depicting a Dependence/Independence Graph Extractor as shown and discussed in FIG. 3, in more detail. In FIG. 4, a particular example is used to help understanding. In FIG. 4 at 410, activities are reviewed. In this example, A-R are defined to be the set difference between all activities in a process model and its routing activities. In addition, A-R are the vertices in both the independence graph and the dependence graph. As provided in 420, dependency edges are calculated. For example, if (a1, a2) is a directed edge in process model P, and a1 is not a routing activity and a2 is not a routing activity, then the edge (a1, a2) is added to the dependence graph. Alternatively, if a2 is a routing activity, and child (a2) is one of the children of a2, then the edges (a1, child(a2)) is added to the dependency graph. In 430, additional edges are also added as appropriate. In this example, for each pair of activities a1, a2—if edge (a1,a2) and edge (a2, a1) is not in the dependence graph, and the least common ancestor of a1 and a2 is an AND vertex in the process model, then undirected edge (a1, a2) is added to the independence graph.

Figure 5:
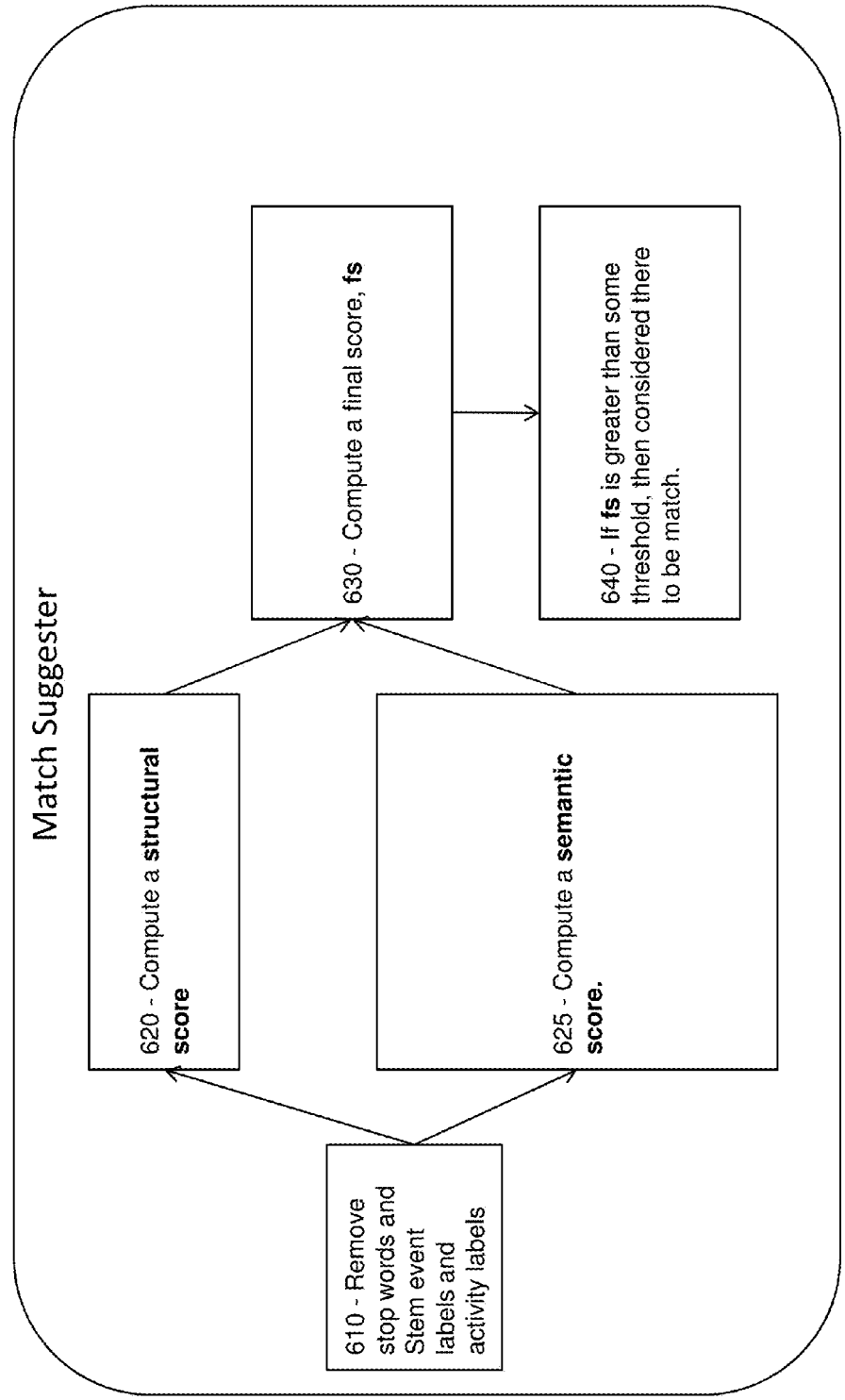
FIG. 5 depicts a block diagram illustrating a Match Suggester in accordance with an embodiment.

In FIG. 5, the Match Suggester of FIG. 2 is more closely explored. The Match Suggester is to make it easier to locate models and activities that exist and can be used. In FIG. 5 at 510, all words that make matching difficult or redundant are first removed. This includes what is referred to as stop words and can include "Stem" event labels and activity labels. Then a matching score is calculated. The latter is performed, in one embodiment, as a two step process. First a structural score is computed at 520. In one example, this can include calculating the Jaccard distance between activity and event labels (order not considered). Subsequent to this a semantic score is calculated at 525 In one embodiment, the scores can be calculated using a following example. Let A be an activity label, and E be an event label. The task is to compute the number of words in A that have a synonym in E. First the number of words in A are calculated that are holonyms of words in B and then the number of words in A are calculated that are holonyms of words in B. The counts are then combined to a number S (no double-counting) with the semantic score being equal to $|S|/len(A)$.

In this way the combined scores are calculated and a final score, fs is determined as shown in 530. In one embodiment, the final score is calculated using a linear combination of the structural score (sts) and the semantic score (ses) by assigning each score a weight, $\alpha$. In other words: $fs=\alpha(sts)+(1-\alpha)(ses)$. If the final score, fs, is greater than some threshold, in one embodiment as shown at 540, then A and E are considered to be matched and the process is completed (In one embodiment A can map to multiple E's, but E can map to only one A).

It is understood that in one embodiment of the present invention, the biased model and learned process model can be generated with one or more computing devices including one or more processors. There may be a single computing device processing input information or several computing devices may be in processing communication to provide the final learned process models. The computing devices can include a variety of devices, such as but not limited to mobile devices, personal computers, servers or others such devices can further include internal and external storage devices, display devices, input/output interfaces, printers and/or other components as can be appreciated by those skilled in the art.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
    extracting data associated with a process execution trace of a running process and extracting any prior knowledge data relating to said running process;
    calculating at least one transition confidence parameter for said prior knowledge data;
    identifying any existing process models relating to said running process;
    generating a confidence trace bias for any said existing process model identified;
    calculating an enhanced bias value by combining said confidence trace bias value and value of said transition confidence parameter; and
    generating a learned process model by using as input said extracted process execution trace data, said prior knowledge data, said identified existing model and said enhanced bias value.

2. The method of claim 1, further comprising using said learned process model to automate said running process.

3. The method of claim 2, wherein said extracting prior knowledge data has an associated transition confidence parameter.

4. The method of claim 3, further comprising identifying any matches in activities between any identified existing process models and said process execution trace.

5. The method of claim 4, further comprising generating a confidence trace bias based on an identified match existing between said existing process model and said process execution trace.

6. The method of claim 5, wherein said confidence trace bias is generated also based on said transition confidence parameter associated with said prior knowledge data.

7. The method of claim 6, further comprising applying any existing model against bias enhanced trace to enhance or produce a new model.

8. The method of claim 1, wherein said prior knowledge data includes data extracted from documentation and diagrams.

9. The method of claim 8, wherein prior knowledge data also includes user input.

10. The method of claim 9, wherein update to said learned process model is made when there is revising of said transition confidence parameters.

11. The method of claim 1, wherein said process execution trace data includes database logs, server logs, and application logs.

12. The method of claim 1 wherein said process execution trace data includes event traces associate with one or more activities.

13. The method of claim 1, wherein process execution trace data includes trace data associated with a plurality of activities.

14. The method of claim 13, wherein each of said activities are a sequence of activities.

15. The method of claim 1 wherein said learned process model is updated automatically.

16. The method of claim 15, wherein said learned process model is updated when any of said input is revised.

17. The method of claim 15, wherein said input includes matching of activities from a previous process model to one or more events.

* * * * *